United States Patent [19]

Yamamoto

[11] Patent Number: 5,033,859
[45] Date of Patent: Jul. 23, 1991

[54] FACSIMILE APPARATUS

[75] Inventor: Makoto Yamamoto, Shiga, Japan

[73] Assignee: Murata Kikai Kabushiki Kaisha, Kyoto, Japan

[21] Appl. No.: 420,543

[22] Filed: Oct. 12, 1989

[30] Foreign Application Priority Data

Oct. 17, 1988 [JP] Japan .................................. 63-260939

[51] Int. Cl.⁵ .............................................. H04H 1/32
[52] U.S. Cl. ...................................... 358/468; 358/442
[58] Field of Search ............... 358/403, 405, 400, 401, 358/404, 440, 442, 468

[56] References Cited

U.S. PATENT DOCUMENTS

| 4,086,443 | 4/1978 | Gorham | 358/440 |
| 4,831,457 | 5/1989 | Watanabe | 358/401 |
| 4,916,732 | 4/1990 | Kotani | 358/440 |

Primary Examiner—Edward L. Coles, Sr.
Attorney, Agent, or Firm—Spensley Horn Jubas & Lubitz

[57] ABSTRACT

A facsimile apparatus is driven and controlled by previously assigning and storing conditions matching with particular application purposes to a particular single key with a program key device and then calling conditions matching with particular application purpose with a single action of single key, and other parameters can also be added as required by selecting particular keys.

4 Claims, 4 Drawing Sheets

FACSIMILE APPARATUS

FIELD OF THE INVENTION

The present invention relates to keying operation of facsimile apparatus and particularly to a facsimile apparatus having simplified keying operations.

RELATED ART STATEMENT

A facsimile apparatus provides a plural kinds of function selection keys, ten keys and abbreviated dial keys and executes therewith selection of predetermined communication mode, setting of dial or timer transmission time and a parameters such as setting of password.

However, selection of communication mode, setting of dial or timer transmission time and setting of parameters such as a password requires at least several minutes in the communication mode frequently used, and moreover repeated keying operations allows for the occurrence of mistakes in the keying operation and when a keying mistake is detected, the keying operation must be repeated again.

In addition, it can also be estimated that when other functions are added to the facsimile apparatus, the number of keys also increases and operation may be more complicated.

OBJECT AND SUMMARY OF THE INVENTION

It is an object of the present invention to provide a facsimile apparatus which presets the communication mode often used to predetermined keys, thereby reducing operation steps of parameter keys in view of eliminating mistakes in the keying operation and improving operability of keys.

A facsimile apparatus of a first embodiment comprises a program key means for including keys previously assigned and storing conditions matching with particular application purposes to a particular single key and driving and controlling a facsimile apparatus by calling conditions matching with particular application purposes with a single action of a single key and a key means for controlling a facsimile apparatus by inputting all parameters, at the time of execution, of the conditions matching with said particular application purposes during use of a facsimile apparatus.

A facsimile apparatus of a second embodiment comprises a program key means including keys previously assigned and storing conditions matching with particular application purposes to a particular single key and driving and controlling a facsimile apparatus by calling conditions matching with particular application purposes with a single action of the single key, a half program key means for controlling a facsimile apparatus by inputting a part of parameters, at the time of execution, of conditions matching with said particular application purpose during use of the facsimile apparatus, and a key means for controlling a facsimile apparatus, by inputting all parameters, at the time of execution, of conditions matching with the particular application purposes.

In the first embodiment, the facsimile apparatus is driven and controlled by previously assigning and storing conditions matching particular application purposes to a particular single key with the program key means and then calling conditions matching with particular application purposes with a single action of the single key. In the mode not preset to the program key means, a facsimile apparatus is driven and controlled by inputting all parameters of conditions matching with particular application purposes at the time of execution thereof.

In the second embodiment, a facsimile apparatus is driven and controlled by adding the half program key means to the first invention and then inputting only a part of parameters of conditions matching with particular application purposes at the time of execution thereof.

DETAILED DESCRIPTION OF PREFERRED EMBODIMENT

Figure 1:
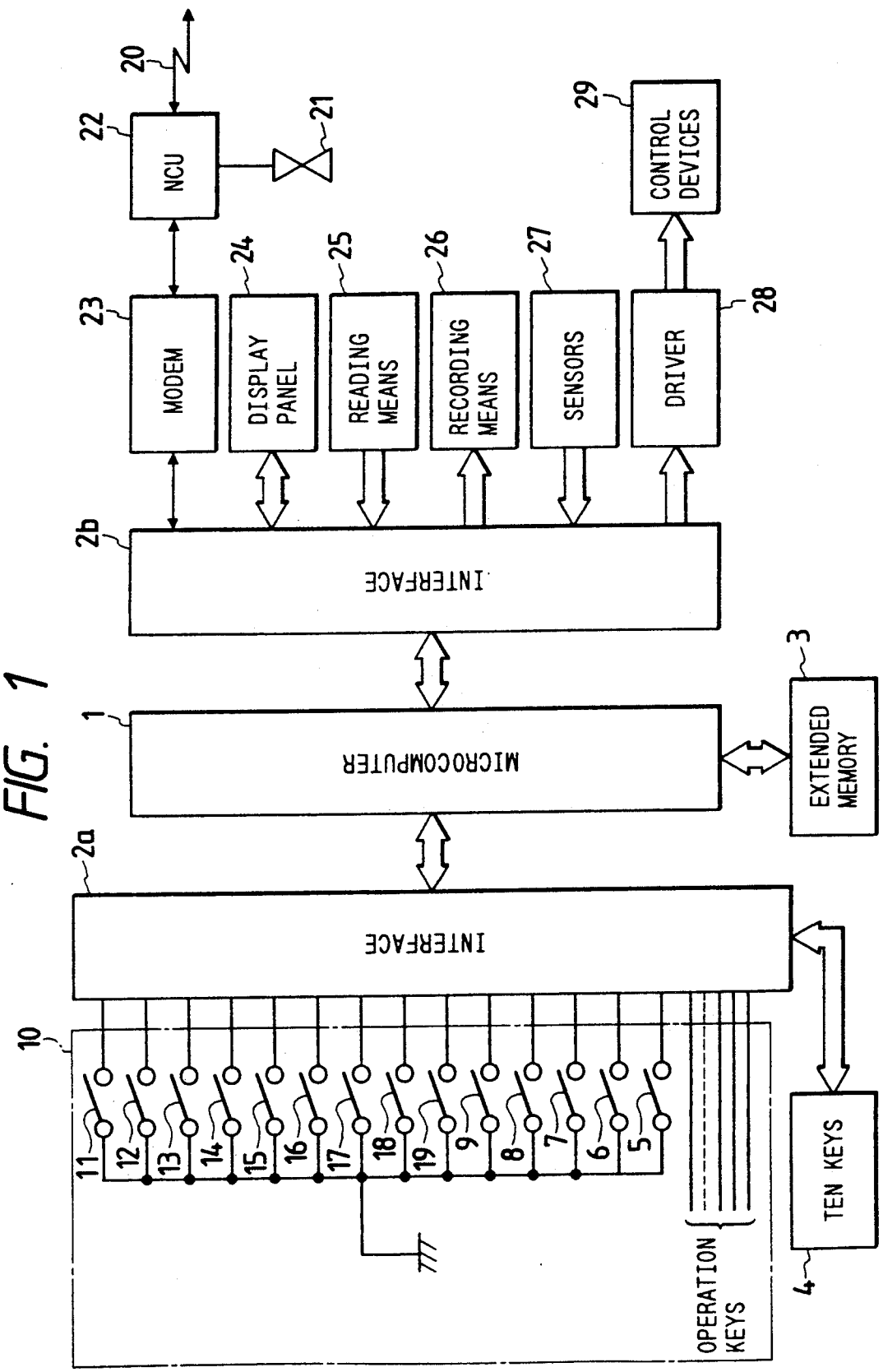
FIG. 1 is a structural block diagram of a facsimile apparatus as an embodiment of the present invention.

FIG. 1 is a block diagram of a facsimile apparatus as an embodiment of the present invention.

In the Figure, a microcomputer 1 is a processing and control circuit which processes the signals and controls various control devices and comprises ROM for storing the program to operate the facsimile apparatus of this embodiment and RAM for storing various data to be used for processing. The microcomputer 1 is connected with an interface 2a and interface 2b. An extended memory 3 stores image data read from a document with a reading means 25 comprised of the CCD image sensor and outputs such stored image data to a communication party at the predetermined time depending on the instruction from the microcomputer 1. The stored image data is usually sent to the communication party at the predetermined time through the switches arranged on the various keys of an operation panel 10. This extended memory 3 also has the memory areas assigned to the keys from the first program key 11 to the fifth program key 15 (hereinafter, described as the nth program key in case it does not mean the particular program key).

The interface 2a is connected with a simultaneous transmission key 8 to simultaneously transmit image data to particular subscribers, a polling key 7 to receive image data from particular subscribers and a password setting key 6 to be used for setting and changing password. Moreover, the interface 2a is also connected with a timer communication key 5 to send or receive image data in the predetermined time. In addition, the interface 2a is connected with the ten keys 4 to conduct dialing and set the transmission time, password and the number of sheets of document to be transmitted.

The interface 2a is further connected with a program setting key 16 which facilitates setting to the nth program key conditions matching with a particular application purpose, an avoidance key 17 which is operated to avoid setting of the parameters which are not required to be set to the nth program keys 11–15 and a parameter changing key 18 for storing so that only the determined parameters of a program set to the nth program keys 11–15 are input at the time of execution. Moreover, a memory sending key 19 for transmitting a document after once storing it to the extended memory 3 and a feeder sending key 9 for transmitting a document direct without storing it in the extended memory 3 are also connected to the interface 2a.

For the convenience of explanation about the present invention, the avoidance key 17 and parameter changing key 18 are provided as independent keys but since these keys are not always used, the "*" key of ten keys 4 may be used as the avoidance key 17 and the "#" key of ten keys 4 may be used as the parameter changing key 18. In addition, the other keys, for example, the memory sending key 19 for transmitting the document after once storing it to the extended memory 3 and the feeder sending key 9 for transmitting the document direct without storing it in the extended memory 3 may be provided so that the memory sending and feeder sending can be selected in repetition depending on the number of times of repeated operations of the memory sending key 19 by initializing the feeder sending.

The interface 2b is connected with a modem 23 which modulates or demodulates an output signal of the facsimile apparatus to/from the signal transmitted over the line 20. In this embodiment, a network control unit (NCU) 22 is connected between the modem 23 and line 20 to select the connection between the line 20 and modem 23 or the connection between the line 20 and telephone set 21. Moreover, the modem 23 provides a function to execute training with a communication party based on an instruction issued from the microcomputer 1 to select a communication rate and realizes communication with the selected communication rate.

A display panel 24 connected to the interface 2b is constituted by a display means utilizing the liquid crystal to display the input by ten keys 4 for dialing and setting of sending time, password and the number of sheets to be transmitted and the selected mode. The interface 2b is also connected with a reading means 25 comprised of CCD image sensor. A recording means 26 connected to the interface 2b is composed of a thermal head for recording data to a thermosensible recording sheet. The sensors 27 connected to the interface 2b include a sensor for detecting a document placed on the document setting plate, a sensor for detecting passage of a document and a sensor for detecting existence of a recording sheet. Various control devices 29 connected to the interface 2b through the driver 28 are driven through the driver 28 and include a sheet supply roller, a sheet exhaust roller, a stepping motor for rotating the sheet exhaust roller, a stepping motor for rotating a platen roller to move a recording sheet and a motor for rotating a movable blade.

The facsimile apparatus of the present invention structured as explained above transmits and receives an ordinary image data as explained hereunder.

In the case of sending data to the communication party upon reading of a document, namely operation mode is returned to the initial condition or to the feeder sending mode by turning ON the feeder sending key 9 of the operation panel 10, the communication party is determined by dialing with the ten keys 4. A document placed on the document setting plate is read by a reading means 25 when it reaches the reading position and the image data is then output to the line 20 through the interface 2b, modem 23 and network control unit 22.

In the case of memory sending mode wherein a document is read, it is then once stored in the extended memory 3 and image data is sent to the communication party from the extended memory 3 at the predetermined time, when the memory sending key 19 of operation panel 10 is turned ON, read operation of document is started by the reading means 25 and image data is stored on the extended memory 3. When all pages are stored, the next document is read and necessary pages are stored in the extended memory 3. The image data stored in the extended memory 3 is transmitted to the communication party at the time designated from the operation panel 10.

As described, the facsimile apparatus of an embodiment of the present invention is capable of executing the feeder transmission or memory transmission and moreover, as is well known, it is capable of simultaneously transmitting image data to the particular subscribers by operation of the simultaneous transmission key 8 of the facsimile apparatus and receiving image data from particular subscribers by operation of the polling key 7.

Figure 2:
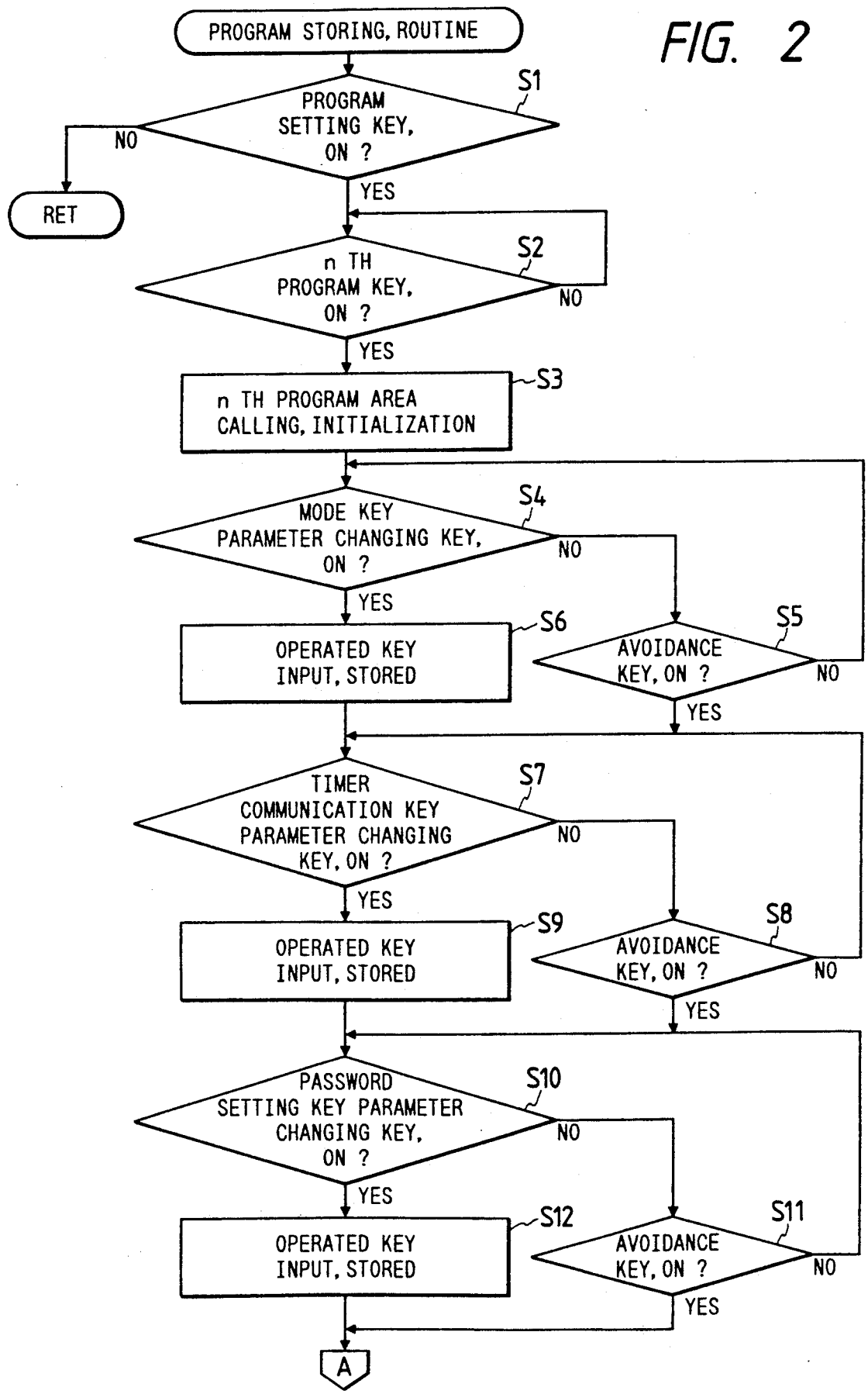
FIG. 2 and FIG. 3 show flowcharts of "program storing routine" used in the facsimile apparatus as an embodiment of the present invention.
Figure 3:
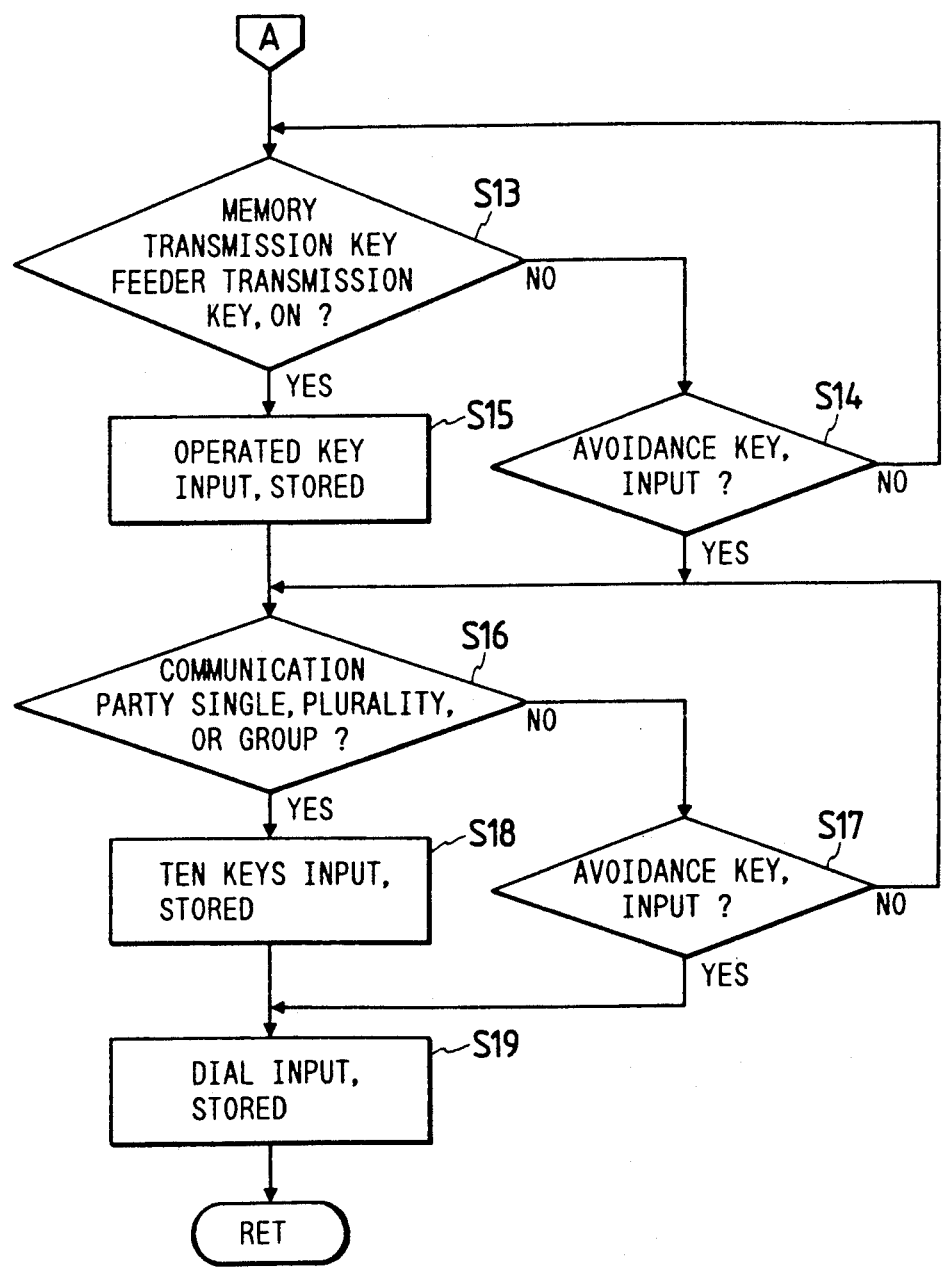
Figure 4:
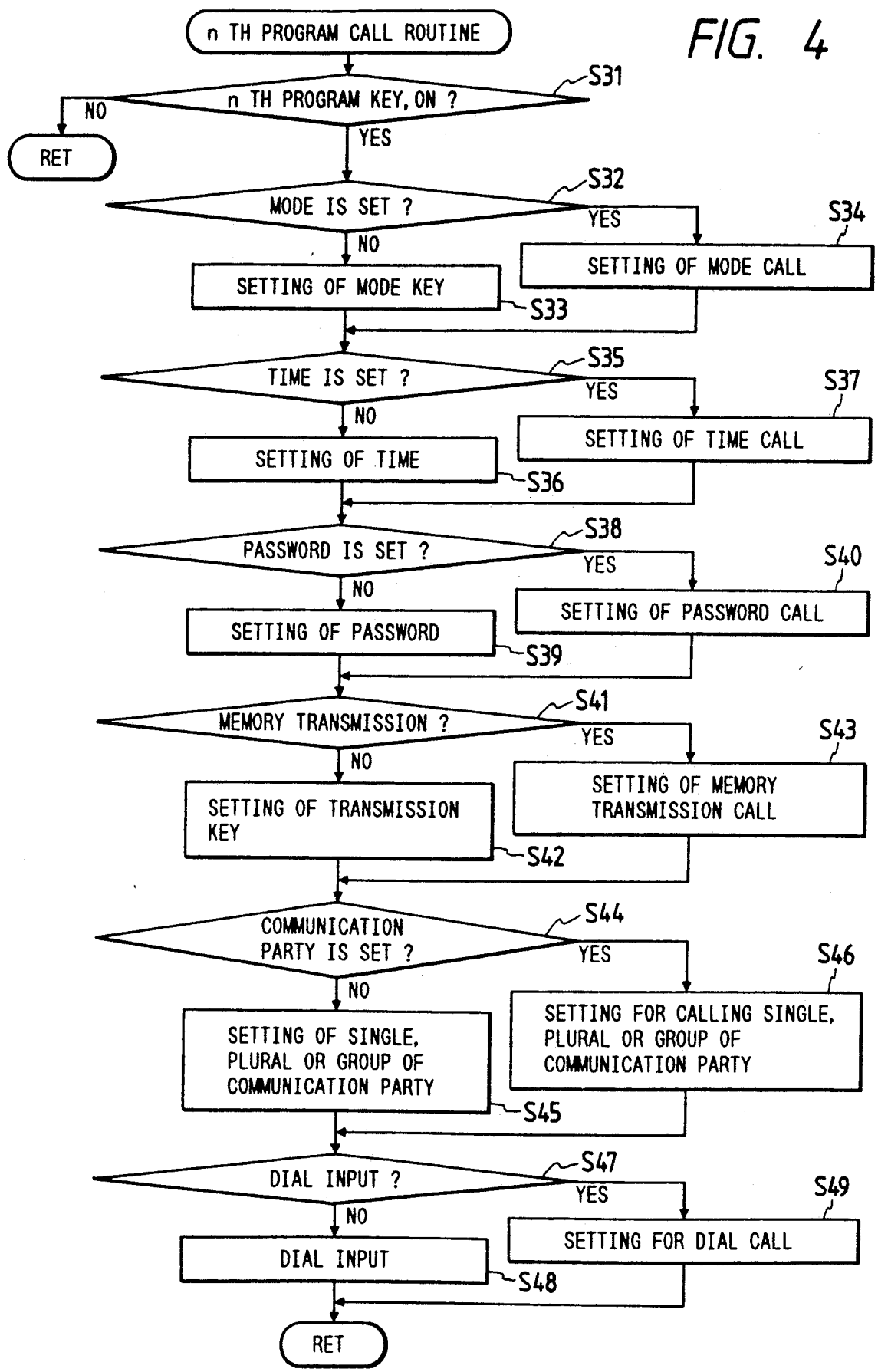
FIG. 4 is a flowchart of "program call routine" used in the facsimile apparatus as an embodiment of the present invention.

Next, the "program storing routine" of the facsimile apparatus as an embodiment of the present invention shown in FIG. 2 and FIG. 3 and the "program call routine" of the facsimile apparatus as an embodiment of the present invention shown in FIG. 4 will be explained.

These "program storing routine" and "program call routine" are called during execution of the main program of the facsimile apparatus as the embodiment of the present invention and the first to fifth program areas of extended memory 3 are first initialized in the main routine.

At the decision area of the flowchart, the object of decision is indicated by language on the display panel 24 but the display processing is omitted from the explanation for simplifying the flowchart.

First, the ON condition of program setting key 16 on the operation panel 10 is decided in the step S1. When the program setting key 16 is maintained at the OFF condition, this routine is immediately terminated. When the ON condition of program setting key 16 is decided in the step S1, if any one of the nth program keys 11-15 turns ON after waiting for the ON state of the nth program key in the step S2, the nth program area of extended memory 3 assigned to the nth program keys 11-15 is called and initialized in the step S3. When the determined mode keys (except for the timer communication key 5) such as simultaneous transmission key 8 and polling key 7 are turned ON or the parameter changing key 18 which means selective setting of the determined mode at the time of transmission are turned ON in the step S4, the keying input is stored in the step S6. Moreover, when the avoidance key 17 is turned ON in the step S5, it means that the predetermined mode key is not used, storing in the step S6 is avoided and the ordinary communication mode initially set starts. Next, it is decided in the step S7 by the ON state of the parameter changing key 18 whether the time input is set by deciding the ON state of the timer communication key 5 or the time input is determined at the time of transmission, and time input set by the ten keys 4 or input of parameter changing key 18 is stored in the step S9. Moreover, when the avoidance key 17 is input in the step S8, since the time input setting is unnecessary, storing in the step S9 is avoided.

In the step S10, it is decided by the ON state of the parameter changing key 18 that the password setting key 6 is ON or whether the password is determined at the time of transmission, and the predetermined password is set by the ten keys 4 or input of parameter changing key 18 is stored in the step S12. In addition, since setting of password is unnecessary when the avoidance key 17 is input in the step S11, storing in the step S12 is avoided. In the step S13, selection of memory transmission is decided by the ON state of memory transmission key 19 or whether the memory transmission of feeder transmission is determined at the time of transmission or not is decided, and in the step S15, input of the memory transmission key 19 or parameter changing key 18 is stored. Moreover, when the avoidance key 17 is input in the step S14, it is unnecessary to set the memory transmission and therefore storing is made under the condition that the initially set feeder transmission is selected.

In addition, it is decided in the step S16 whether a single party, a plurality of party or the determined groups are selected or not as the communication party, and "1" is input from the ten keys 4 for single party, or a numeral key from "2" to "9" is input for a plurality of party, or the keys "01" to "09" are input for the groups. In other case, it is decided from the ON state of parameter changing key 18 whether the communication party is determined at the time of transmission or not and the storing area of such inputs is designated in the step S18. When the avoidance key 17 is input in the step S17, the initialized destination party is supposed as the single party and the practical dial input is set using the ten keys 4 in the step S19 completing this routine.

The "program call routine" for calling contents preset to the determined nth program key as described above will be explained.

When the "program call routine" is called by processing of the main routine, the ON state of only one of the nth program keys 11-15 of operation panel 10 is decided in the step S31 and this routine is completed, unless the nth program keys 11-15 are turned ON. When the ON state of any one of nth program keys 11-15 is decided in the step S31, it is then decided in the step S32 whether the parameter changing key 18 is turned ON in the memory of the mode determination region of the nth program area which means selective setting of the mode keys such as the simultaneous transmission key 8 and polling key 7 at the time of transmission. When this key is ON, input of the mode keys such as simultaneous transmission key 8 and polling key 7 is set in the step S33. When the parameter changing key 18 is not turned ON in the memory of mode determination region, namely when the mode is set, the determined mode key or initially set ordinary mode is set in the step S34.

Next, it is decided that the parameter changing key 18 is turned ON or not in the memory of time determination region which means the time setting is carried out at the time of transmission in the step S35. When the key is turned ON, the time is input using the ten keys 4 in the step S36 and when the key is not turned ON in the memory of time determination region, the determined stored time is set or time setting is avoided in the step S37.

Next, it is decided in the step S38 whether the parameter changing key 18 is turned ON in the memory of password determination region which means password setting is carried out at the time of transmission. When the key 18 is ON, the password is input using the ten keys 4 in the step S39. When the parameter changing key 18 is not turned ON in the memory of password determination region, the determined stored password is set or setting of password is avoided in the step S40.

In addition, it is decided in the step S41 whether the parameter changing key 18 is turned ON in the memory of memory transmission determination region which means that setting of memory transmission or feeder transmission is carried out at the time of transmission. When the key 18 is ON, the memory transmission key 19 or feeder transmission key 9 is input in the step S42.

When the parameter changing key 18 is not turned ON in the memory of the memory transmission or feeder transmission determination region, the determined stored memory transmission or feeder transmission is set in the step S43.

In the step S44, it is decided whether the parameter changing key 18 is turned ON in the memory of destination determination region which means that the destination of transmission is set at the time of transmission. When the key 18 is ON, "1" is input for the single communication party, or the one of "2"-"9" is input for a plurality of communication parties or any one of "01"-"09" is input for the communication party groups using the ten keys in the step S45. Moreover, when the parameter changing key 18 is not turned ON in the memory of destination determination region in the step S44, determined stored number of communication parties or groups being stored in the memory is set in the step S46. Or, "1" is set for the number of communication parties.

In the step S47, it is decided whether the parameter changing key 18 is turned ON in the memory of dial determination region which means that dial setting is carried out at the time of transmission. When the key 18 or ON, the dial is input using the ten keys 4 in the step S48 and when the key 18 is not turned ON in the memory of dial determination region, the determined stored dial is set in the step S49.

As described, the facsimile apparatus of this embodiment proposes, as the embodiment of the second invention, the structure of the program key means consisting of single or a plurality of keys for driving and controlling the facsimile apparatus by previously assigning the conditions matching with particular application purposes to a particular single key consisting of the nth program keys 11-15 and storing such conditions in the nth program area of the extended memory in the "program storing routine" and calling the conditions matching with the particular application purposes with the single action of the single key in the "program call routine", a half program key means for storing the conditions matching with the particular application purposes to the region of determined memory in the "program storing routine" for controlling the facsimile apparatus by inputting a part of parameters of such condition at the time of execution and inputting the necessary parameters in the "program call routine" and the well known key means for controlling the facsimile apparatus by inputting all parameters of the conditions matching with the particular application purposes at the time of execution.

In the embodiment of the invention of this type, the communication can be defined by selection of only the nth program keys 11-15 and other parameters can also be added as required. Therefore, manipulation capability of facsimile apparatus can be improved, moreover manipulation efficiency can also be improved and manipulations can be done without any artificial mistakes.

Moreover the facsimile apparatus of this embodiment proposes, as the embodiment of the first invention, a structure of a program key means consisting of a single or a plurality of keys for driving and controlling facsimile apparatus by previously assigning conditions matching with the particular application purposes to the particular single key consisting of nth program keys 11-15 in the "program storing routine", storing such conditions in the nth program area of the extended memory 3 and calling the conditions matching with the particular application purposes by the single action of the single key in the "program call routine" and the well known key means for controlling facsimile apparatus by inputting all parameters, at the time of execution, of the conditions matching with the particular application purposes when the apparatus is to be used.

Namely, the half program key means for storing the conditions matching with the particular application purposes, during the execution thereof, to the region of determined memory with the parameter changing key 18 in the "program storing routine" for controlling the facsimile apparatus by inputting a part of parameters and inputting the necessary parameters in the "program call routine" is eliminated and storing of nth program area of extended memory 3 assigned to the particular single key consisting of the nth program keys 11-15 is called and can be set.

In the embodiment of the invention of this type, since the conditions conforming to particular application purposes can be obtained with single action, the operability of facsimile apparatus can be improved and operation efficiency can also be enhanced and thereby operation can be done without any artificial mistakes by selecting only the nth program keys 11-15.

As described above, the facsimile apparatus of the first embodiment comprises a program key means consisting of a single or a plurality of keys for driving and controlling the facsimile apparatus by assigning and storing the conditions matching with particular application purposes to a particular single key and calling the conditions matching with particular application purposes with the single action of the single key. Therefore, the communication mode can be defined, operability of facsimile apparatus can be improved and moreover operation efficiency can also be enhanced. Moreover, since operation of parameter keys can be reduced and thereby operations can be done without artificial mistakes.

The facsimile apparatus of the second embodiment comprises a program key means consisting of a single or a plurality of keys for driving and controlling the facsimile apparatus by assigning and storing the conditions matching with particular application purposes to particular single key and calling such conditions matching with particular application purposes with single action of single key and a half program key means for controlling the facsimile apparatus by inputting a part of parameters of the conditions matching with particular application purposes at the time of execution. Therefore, since the communication mode can be defined and other parameters can also be added as required by selecting particular keys, operability of facsimile apparatus can be improved and operation efficiency can also be enhanced and operations can be done without any artificial mistakes.

What is claimed is:

1. A facsimile apparatus comprising:
   key means including a plurality of keys for controlling the facsimile apparatus, the key means enabling manual input of parameters associated with a particular use of the facsimile apparatus,
   program key means for matching at least one stored parameter to at least one predetermined key, and for controlling the facsimile apparatus with the at least one stored parameter by action of the at least one predetermined key, the program key means enabling automatic input of stored parameters associated with the particular use of the facsimile apparatus through the action of the at least one predetermined key.

2. A facsimile apparatus according to claim 1, further comprising:
   half program key means for automatically inputting a predetermined number of stored parameters associated with the particular use of the facsimile apparatus, a remaining number of parameters associated with the particular use of the facsimile apparatus being input to the facsimile apparatus at the time of operation of the facsimile apparatus.

3. A facsimile apparatus according to claim 1, wherein the program key means matches a plurality of stored parameters to each of the plurality of keys, each of the plurality of keys being associated with a respective predetermined use of the facsimile apparatus, the program key means enabling automatic input of all stored parameters associated with a respective predetermined use of the facsimile apparatus through action of the respective one of the plurality of keys.

4. A facsimile apparatus according to claim 1, wherein the stored parameters includes at least one of a dial transmission time, timer transmission time, communication mode, number of sheets to be transmitted and password.

* * * * *